United States Patent
Gelbaum et al.

(10) Patent No.: US 8,930,249 B1
(45) Date of Patent: Jan. 6, 2015

(54) SYSTEM, METHOD, AND COMPUTER PROGRAM FOR PROVIDING AN ADVERTISING BASED INCENTIVE TO A USER

(75) Inventors: Eitan Gelbaum, Petach Tikva (IL); Michael Michie, Olathe, KS (US)

(73) Assignee: Amdocs Software Systems Limited, Dublin (IE)

( * ) Notice: Subject to any disclaimer, the term of this patent is extended or adjusted under 35 U.S.C. 154(b) by 1709 days.

(21) Appl. No.: 12/116,091

(22) Filed: May 6, 2008

(51) Int. Cl.
*G06Q 30/02* (2012.01)

(52) U.S. Cl.
USPC ......................................................... 705/35

(58) Field of Classification Search
USPC ..................................................... 705/35–45
See application file for complete search history.

(56) References Cited

U.S. PATENT DOCUMENTS

| | | | |
|---|---|---|---|
| 5,946,646 A * | 8/1999 | Schena et al. ................. 702/177 |
| 6,253,188 B1 * | 6/2001 | Witek et al. ................. 705/14.54 |
| 7,069,515 B1 * | 6/2006 | Eagle et al. .................... 715/747 |
| 2002/0046084 A1 * | 4/2002 | Steele et al. ..................... 705/14 |
| 2002/0194065 A1 * | 12/2002 | Barel et al. ....................... 705/14 |
| 2003/0208754 A1 * | 11/2003 | Sridhar et al. ................... 725/34 |
| 2004/0133909 A1 * | 7/2004 | Ma ................................... 725/34 |
| 2005/0096975 A1 * | 5/2005 | Moshe ............................ 705/14 |
| 2007/0116227 A1 * | 5/2007 | Vitenson et al. .......... 379/207.02 |
| 2007/0255696 A1 * | 11/2007 | Desbarats .......................... 707/3 |
| 2008/0004949 A1 | 1/2008 | Flake et al. ...................... 705/14 |
| 2008/0027814 A1 * | 1/2008 | Kulakowski et al. ............ 705/14 |
| 2009/0157612 A1 * | 6/2009 | Su et al. ............................ 707/3 |

* cited by examiner

*Primary Examiner* — Robert R Niquette
*Assistant Examiner* — Chia Yi Liu
(74) *Attorney, Agent, or Firm* — Zilka-Kotab, PC

(57) ABSTRACT

A system, method, and computer program are included for providing an advertising based incentive to a user. In use, at least one advertisement is communicated to a device of a user based on a preference level of the user. Further, an incentive associated with the preference level is provided to the user in response to the communication of the at least one advertisement.

22 Claims, 6 Drawing Sheets

US 8,930,249 B1

SYSTEM, METHOD, AND COMPUTER PROGRAM FOR PROVIDING AN ADVERTISING BASED INCENTIVE TO A USER

FIELD OF THE INVENTION

The present invention relates to advertising, and more particularly to presenting electronic advertisements.

BACKGROUND

Traditionally, electronic advertising has been utilized for presenting advertisements to user devices, such as mobile devices of users. However, conventional techniques used for presenting electronic advertisements have generally exhibited various limitations. Just by way of example, options available to users regarding receipt of advertisements have customarily limited users to either opting in to receive advertisements or opting out of receiving advertisements.

There is thus a need for addressing these and/or other issues associated with the prior art.

SUMMARY

A system, method, and computer program are included for providing an advertising based incentive to a user. In use, at least one advertisement is communicated to a device of a user based on a preference level of the user. Further, an incentive associated with the preference level is provided to the user in response to the communication of the at least one advertisement.

DETAILED DESCRIPTION

Figure 1:
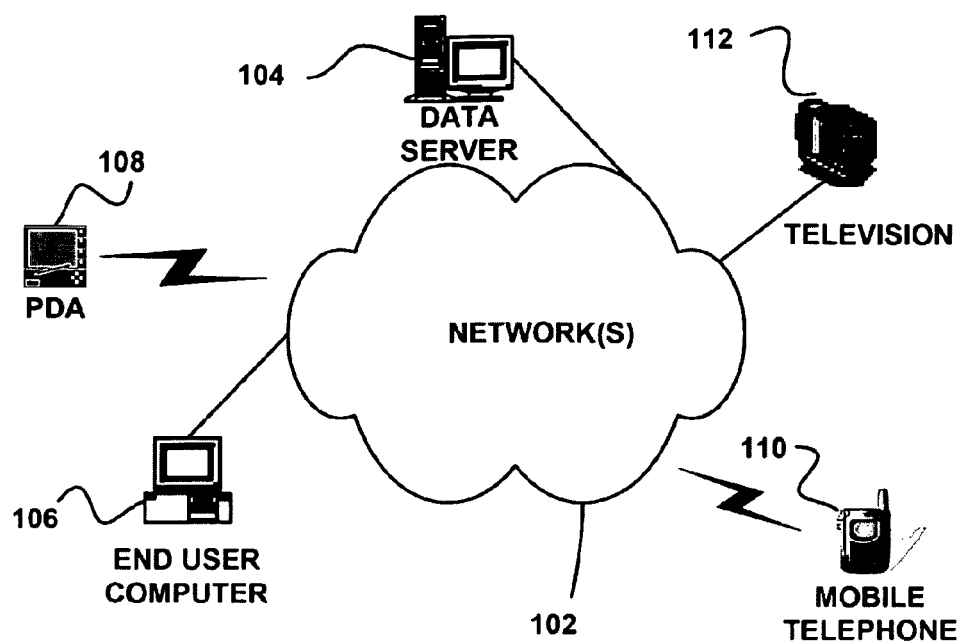
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
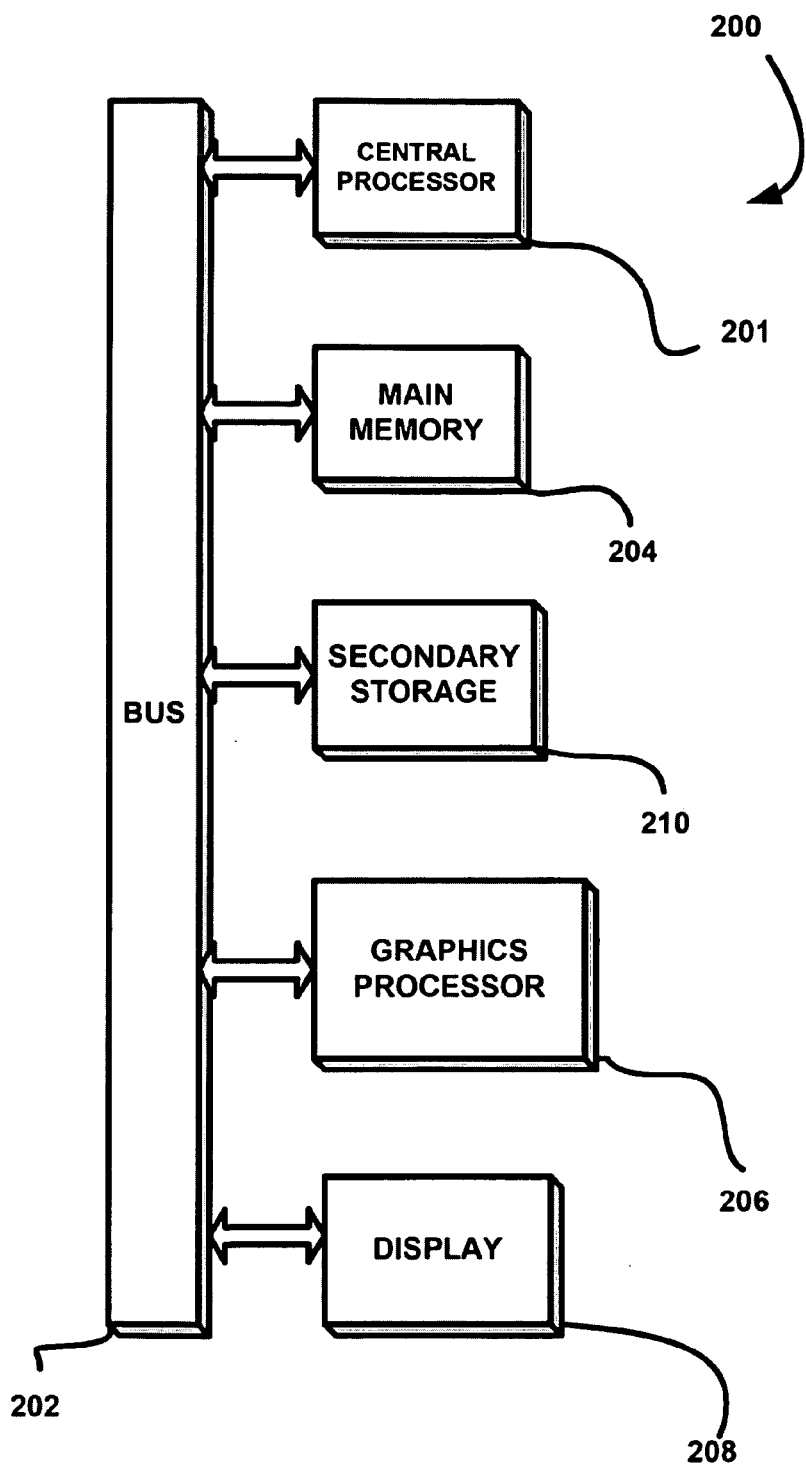
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
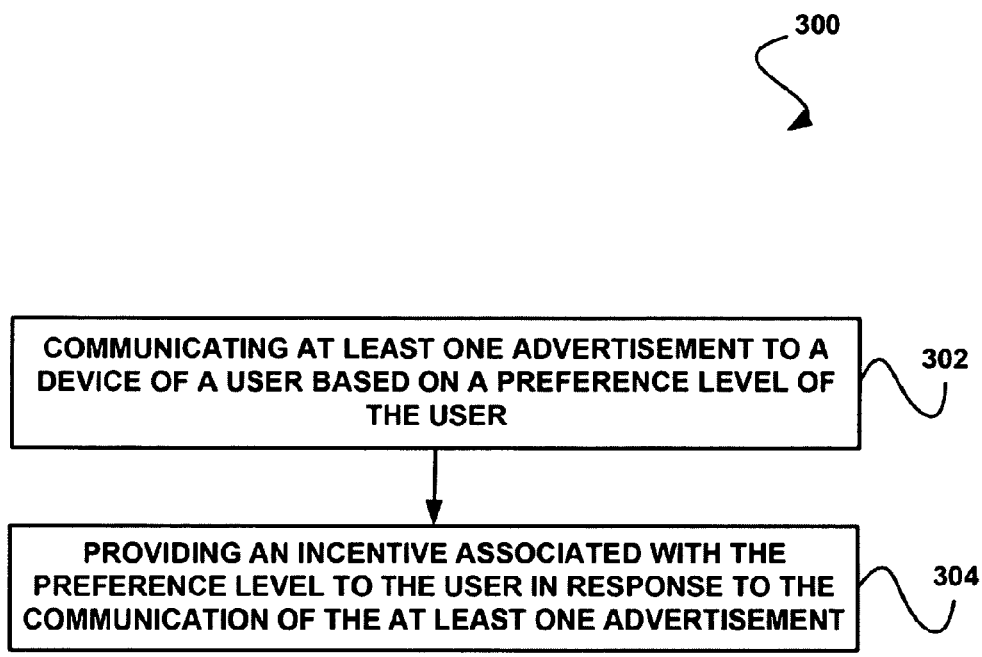
FIG. 3 illustrates a method for providing an advertising based incentive to a user, in accordance with one embodiment.

FIG. 3 illustrates a method 300 for providing an advertising based incentive to a user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, at least one advertisement is communicated to a device of a user based on a preference level of the user. In the context of the present description, the advertisement may include any content utilized for advertising purposes that is capable of being communicated to the device of the user. For example, the advertisement may include content promoting a good and/or service. To this end, the advertisement may be communicated to the device of the user for advertising a good and/or service to the user.

As an option, the advertisement may include a video advertisement. As another option, the advertisement may include a web page. As yet another option, the advertisement may include a short message service (SMS) message. Of course, however, the advertisement may be in any format capable of being communicated to the device of the user.

In one embodiment, the advertisement may be generated by an entity providing the advertised good and/or service. In another embodiment, the advertisement may be communicated to the device of the user from a service provider providing a service to the device of the user. As an option, the service provider may store the advertisement for communication of such advertisement to the device of the user.

Just by way of example, the device of the user may include a mobile device. Accordingly, the service provided to the device of the user may include a wireless communications service, a wireless network service, etc. Of course, it should be noted that the mobile device is set forth for illustrative purposes only, and that the device of the user may include any device capable of receiving an advertisement (e.g. such as of the devices described above with respect to FIGS. 1 and/or 2).

Additionally, the advertisement may be communicated to the device of the user in any desired manner. In one embodiment, the advertisement may be communicated to the device over a network (e.g. wireless network, etc.). In another embodiment, communicating the advertisement to the device of the user may include presenting the advertisement to the user via the device of the user, such as by displaying, audibly presenting, etc. the advertisement on the device of the user.

Furthermore, the preference level of the user may include a level of preference associated with the user for receiving advertisements. For example, in one embodiment, the preference level may identify a number (e.g. a maximum number, etc.) of advertisements preferred to be received by the user via the device. Of course, in another embodiment, the preference level may identify a number of advertisements desired to be received by the user via any number of different devices of the user.

In this way, a number of advertisements communicated to the device of the user may be based on the preference level of the user. For example, the number of advertisements communicated to the device may be less than or equal the preference level of the user. As an option, the preference level of the user may be associated with a predetermined period of time (e.g. a day, week, month, etc.), such that the number of advertisements communicated to the device of the user within the predetermined period of time is within the preference level of the user.

As an option, a plurality of advertisements may be communicated to the device of the user, for example, if the preference level of the user indicates more than one advertisement. As another option, the plurality of advertisements may be communicated to the device of the user over any period of time. Just by way of example, each of the plurality of advertisements may be communicated to the device of the user as an opportunity for receiving an advertisement on the device is identified.

In addition, the preference level of the user may optionally be selected by the user. In one embodiment, the user may utilize a graphical user interface (GUI) to select the preference level. In another embodiment, the user may select the preference level by calling an operator (e.g. customer service representative, etc.) of a call center and requesting such preference level. To this end, the preference level of the user may be selected by the user for configuring a preference associated with the communication of the advertisement.

As also shown, an incentive associated with the preference level is provided to the user in response to the communication of the advertisement. Note operation 304. With respect to the present description, the incentive may include any promotion, enticement, etc. provided to the user in response to the communication of the advertisement. It should be noted that any number of different incentives may be associated with the preference level and may accordingly be provided to the user in response to the communication of the advertisement.

Just by way of example, the incentive may include a service, such that the service may be provided to the user (e.g. via the device of the user, etc.) in response to the communication of the advertisement. As an option, the service may be provided to the user free of charge. The service may include allowing a predetermined number of messages [e.g. SMS, multimedia messaging service (MMS), text, etc.] to be sent and/or received by the user, providing a predetermined amount of time during which the user may communicate over a network, etc.

As another option, the incentive may include a discount, such that the discount may be provided to the user (e.g. on a good and/or service, etc.) in response to the communication of the advertisement. As another example, the incentive may include a credit, such that the credit may be provided to the user in response to the communication of the advertisement. In one embodiment, the credit may include a monetary credit. For example, the credit may include credit on a fee for a service utilized by the user (e.g. the service associated with the device of the user, etc.), a credit towards purchase of a good (e.g. a ring tone capable of being utilized by the device or any other digital content, a new device, a new accessory for the device of the user, etc.), etc.

Still yet, the incentive may be associated with the preference level of the user in any manner. In one embodiment, the incentive may be predetermined for the preference level of the user. For example, the incentive may be predetermined to be provided with respect to the preference level by a service provider communicating the advertisement. Thus, the incentive may optionally be mapped to the preference level (e.g. in a table, etc.).

To this end, in response to communication of at least one advertisement to a device of the user based on a preference level of the user, the incentive associated with such preference level may be provided to the user. Just by way of example, if the preference level indicates a particular number of advertisements preferred by the user to be received (e.g. within a predetermined period of time, etc.), the incentive associated with the preference level may be provided to the user in response to communication of the particular number of advertisements indicated by the preference level. Accordingly, the user may optionally select the incentive provided by allowing the user to select the preference level, in one embodiment.

As another embodiment, the incentive associated with the preference level may be provided to the user in response to the communication of the advertisement to the device of the user and in response to a determination that the user has action upon the advertisement in a predetermined manner. Just by way of example, the user may optionally be required to act upon a predetermined number of advertisements communicated to the device of the user prior to the incentive being provided to the user. The required action may optionally include selecting a link on the advertisement, interacting with the advertisement, and/or any other predetermined action capable of being associated with the advertisement communicated to the device of the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
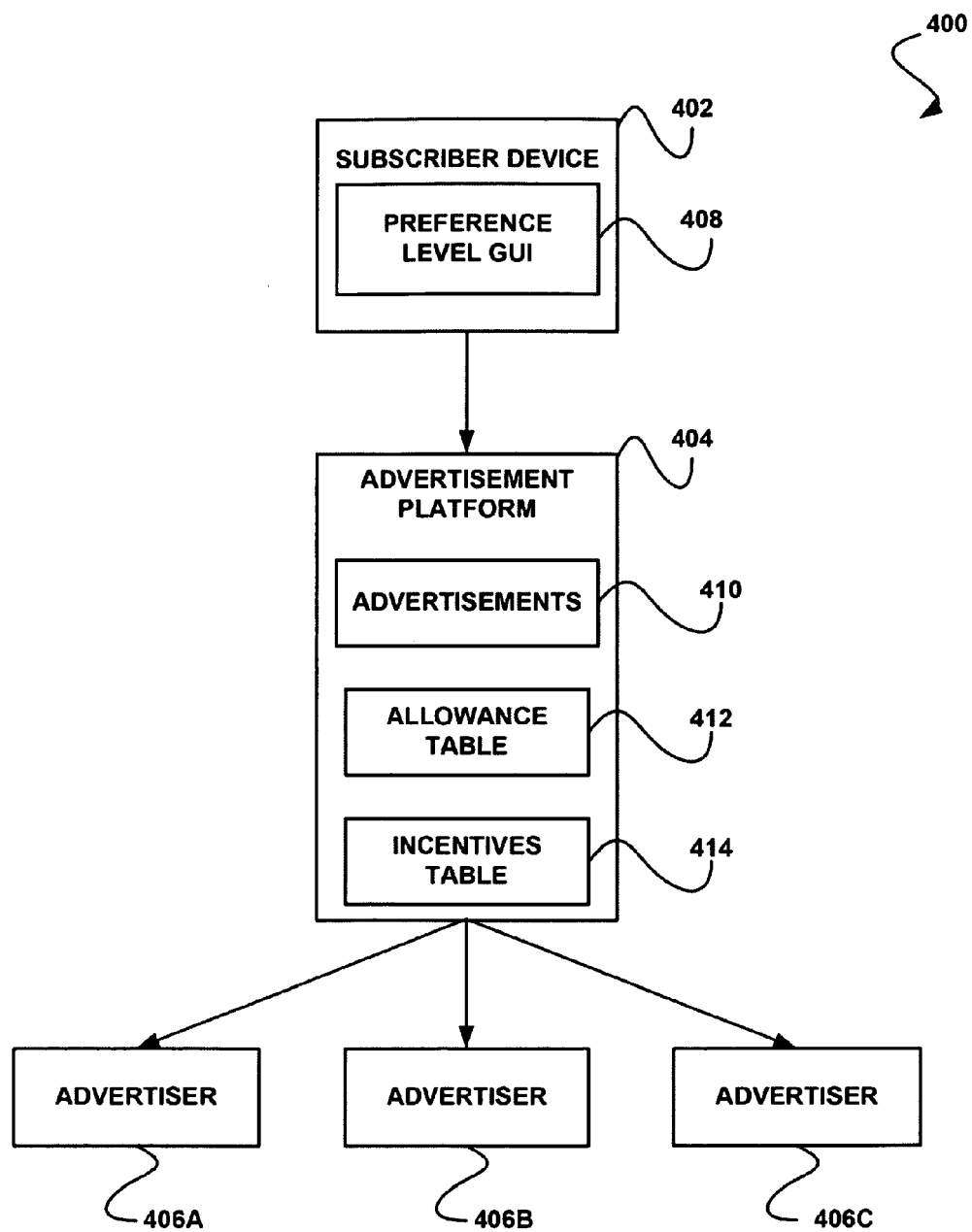
FIG. 4 illustrates a system for providing an advertising based incentive to a user, in accordance with another embodiment.

FIG. 4 illustrates a system 400 for providing an advertising based incentive to a user, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, subscriber device 402 is in communication with an advertisement platform 404 (e.g. via a network, etc.). The subscriber device 402 may include any device of a subscriber capable of receiving an advertisement. For example, the subscriber device 402 may include a mobile device, a workstation and/or any of the other devices described above with respect to FIGS. 1 and/or 2. Additionally, the subscriber associated with the subscriber device 402 may include a user subscribing to receive advertisements via the subscriber device 402 based on a preference level.

The subscriber device 402 includes a preference level graphical user interface (GUI) 408. The preference level GUI 408 may be displayed on the subscriber device 402 for allowing the subscriber to select a level of preference for receiving advertisements. For example, the subscriber may configure the number of advertisements received at the subscriber device 402 utilizing the preference level GUI 408. As an option, the preference level GUI 408 may allow the subscriber to select the preference level at any desired time (e.g. such that the preference level may optionally be updated in real-time), or may only allow the subscriber to select the preference level during predefined periods of time (e.g. based on a preference of the advertisement platform, a business rule, etc.).

In one embodiment, the preference level GUI 408 may display a sliding scale capable of being utilized by the subscriber to select the preference level. As an option, each of a plurality of locations on the sliding scale may be associated with a different preference level. Thus, sliding an icon on the scale from a first position to a second position may change a preference level selection from a first preference level to a second preference level.

In another embodiment, the preference level GUI 408 may display an incentive associated with a selected preference level (e.g. in real time with respect to the selection of the preference level). Just by way of example, each different preference level capable of being selected may be associated with a different incentive, a different package of incentives, etc. In yet another embodiment, the preference level GUI 408 may display an incentive associated with a preference level, such as any information associated with the incentive, in response to selection of the preference level. In this way, the subscriber may be informed of an incentive associated with a selected preference level.

Just by way of example, the incentive may include a monetary credit toward the purchase of content (e.g. ring tones, etc.) provided in response to communication of a predetermined number (e.g. 10, etc.) advertisements to the subscriber device 402. The monetary credit may therefore be redeemed as desired by the subscriber. As another example, the incentive for receiving the predetermined number of advertisements and interacting with a predefined number of the advertisements may include the monetary credit toward the purchase of content described above in addition to a monetary credit toward a fee for a service utilized by the subscriber. In this way, the subscriber may control the level of advertising preferred to be received while providing an incentive to the subscriber for receiving (and optionally interacting with) such level of advertising.

In still yet another embodiment, the preference level GUI 408 may display an option for the subscriber to save the selected preference level. In response to selection of the save option by the subscriber, the selected preference level is sent to the advertisement platform 404. With respect to the present embodiment, the advertisement platform 404 may include a platform of a service (e.g. wireless communication service, etc.) utilized by the subscriber device 402 that is capable of communicating advertisements to the subscriber device 402. While the preference level GUI 408 is described above as being located on the subscriber device 402, it should be noted that in another optional embodiment the preference level GUI 408 may be located on a portal of the advertisement platform 404, such that preference level may be selected by the subscriber via such portal.

The advertisement platform 404 may therefore receive the selected preference level and store the selected preference level in a profile of the subscriber. As shown, the advertisement platform 404 includes an allowance table 412 which may store subscriber profiles. Accordingly, the selected preference level may be stored in the allowance table 412 with respect to the profile of the subscriber. In various embodiments, the subscriber profile may also indicate a type (e.g. format, etc.) of advertising preferred to be received (e.g. SMS, MMS, banner advertisements, etc.), a time of day or day of week during which it is preferred advertisements are received, a predetermined time period in which advertisements are not to be received, and/or any other information capable of being associated with the subscriber.

The advertisement platform 404 also includes a database of advertisements 410. The database of advertisements 410 may store advertisements associated with a plurality of advertisers 406A-C. For example, the advertisers 406A-C may generate advertisements and transmit the advertisements to the advertisement platform 404 for storage in the database of advertisements 410.

In one embodiment, the advertisement platform 404 may identify an opportunity to communicate an advertisement to the subscriber device 402. The opportunity may include, for example, a message in transit to the subscriber device 402 (e.g. via the advertisement platform 404) to which the advertisement may be embedded, attached, etc. As another example, the opportunity may include a state of the subscriber device 402 in which the subscriber device 402 is utilized for accessing a web page. As yet another example, the opportunity may include a state of the subscriber device 402 in which the subscriber device 402 is not being utilized for communication purposes.

In response to identification of the opportunity to communicate an advertisement to the subscriber device 402, the advertisement platform 404 may identify the profile of the subscriber in the allowance table 412 and may further utilize the profile of the subscriber to determine a preference level of the subscriber. Based on the preference level, the advertisement platform 404 may communicate an advertisement selected from the database of advertisements 410 to the subscriber device 402.

Once the advertisement platform 404 determines that a preference of the subscriber indicated by the preference level of the subscriber has been met (e.g. a number of advertisements communicated to the subscriber device 402 meets a threshold number indicated by the preference level of the subscriber), the advertisement platform 404 provides an incentive associated with the preference level to the subscriber. As an option, a notification of the incentive may also be provided to the subscriber (e.g. via the subscriber device 402). In one embodiment, the determination of whether the preference of the subscriber indicated by the preference level of the subscriber has been met may be made during each billing cycle associated with a service utilized by the subscriber (e.g. via the subscriber device 402).

In one embodiment, the advertisement platform 404 may identify the incentive provided to the subscriber utilizing an incentives table 414 included in the advertisement platform 404. The incentives table 414 may map each of a plurality of preference levels to an associated incentive. For example, an incentive (or package of incentives) may be predefined in the incentives table 414 for each different preference level. Thus, the preference level of the subscriber may be utilized to look up the associated incentive in the incentives table 414.

Just by way of example, if the incentive includes a credit, the credit may be applied to a bill for a service utilized by the subscriber generated during the billing cycle in which it is determined that preference of the subscriber indicated by the preference level of the subscriber has been met. As another example, if the incentive includes points towards a good and/or service, a module (not shown) of the advertisement platform 404 may translate the points into a credit capable of being provided to the subscriber.

As an option, the advertisement platform 404 may identify a preference level for each of a plurality of subscribers utilizing profiles of such subscribers in the allowance table 412. Additionally, the advertisement platform 404 may aggregate the preference levels associated with the subscribers (e.g. by generating a summary of a number, or optionally percentage, of subscribers associated with each preference level) and transmit the aggregate to a forecasting system (not shown). The forecasting system may be accessed by the advertisers 406A-C, such that the advertisers may configure advertising campaigns accordingly. For example, if the forecasting system indicates that 10% of subscribers are associated with a preference level indicating a preference for receiving an unlimited number of advertisements, the advertisers 406A-C may infer that an inventory of advertisements capable of being sold during a specific time period is less than if 90% of subscribers are associated with a preference level indicating a preference for receiving an unlimited number of advertisements.

Figure 5:
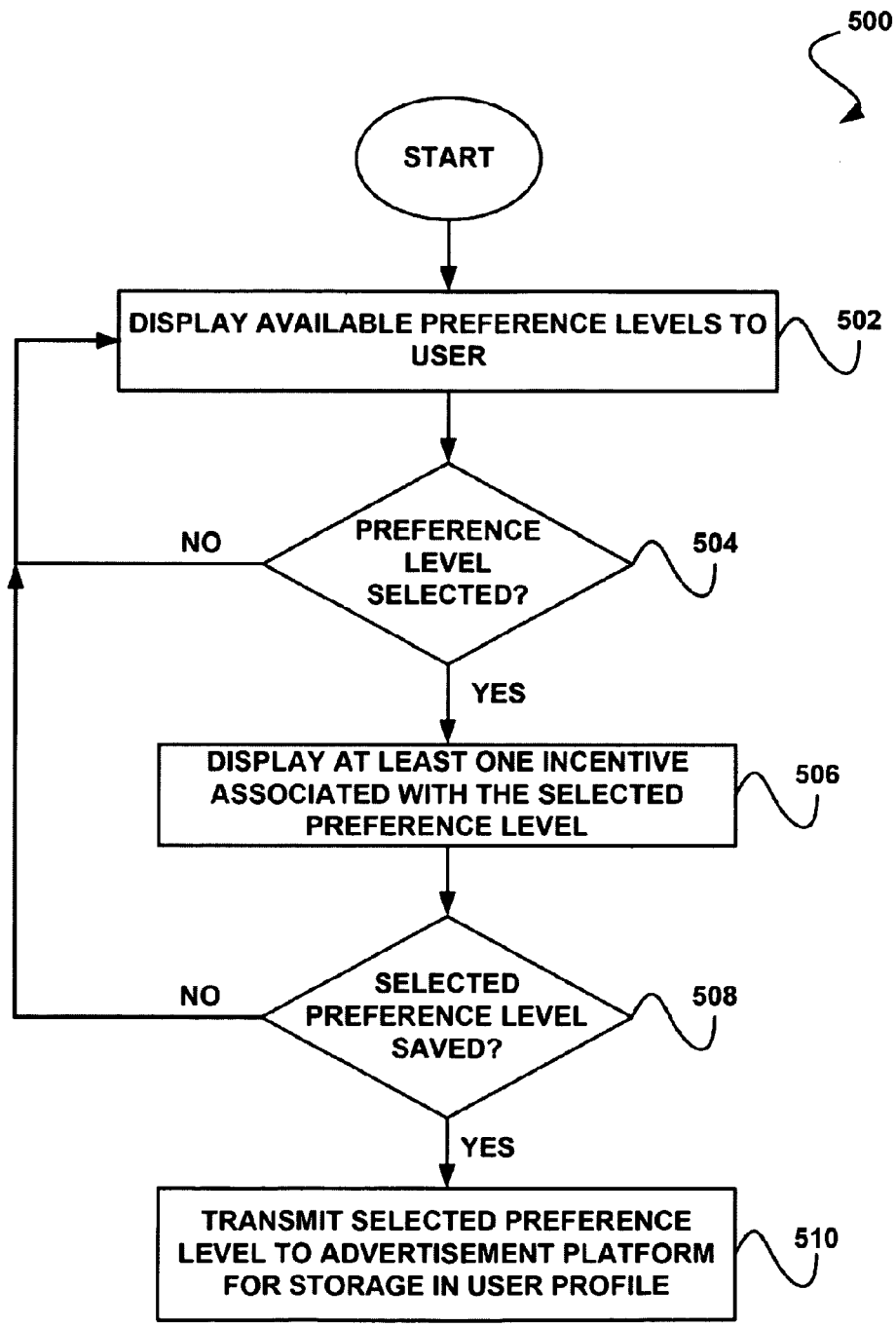
FIG. 5 illustrates a method for storing a preference level selected by a user, in accordance with yet another embodiment.

FIG. 5 illustrates a method 500 for storing a preference level selected by a user, in accordance with yet another embodiment. As an option, the method 500 may be carried out in the context of the details of FIGS. 1-4. For example, the method 500 may be carried out by the subscriber device 402 of FIG. 4. Of course, however, the method 500 may be carried out in any desired environment. Again, the aforementioned definitions may equally apply to the description below.

As shown in operation 502, available preference levels are displayed to a user. The available preference levels may indicate various preferences associated with receiving advertisements which are predetermined to be associated with incentives. In one embodiment, the available preference levels may be displayed on a device of the user. For example, the available preference levels may be displayed utilizing a sliding scale graphic displayed in GUI on the device of the user.

As an option, the available preference levels may be displayed in response to a request by the user for the display of the available preference levels. Just by way of example, the user may select an option via the device of the user to display the available preference levels. As another option, the available preference levels may be displayed automatically at predetermined intervals.

Additionally, it is determined whether a preference level is selected, as shown in decision 504. The preference level may be selected in any manner that utilizes the displayed available preference levels. For example, a preference level may be selected in response to the user moving an indicator on the sliding scale to a particular location indicative of the preference level.

If it is determined that a preference level is not selected, the method 500 continues to wait for a preference level to be selected. If, however, it is determined that a preference level is selected, at least one incentive associated with the selected preference level is displayed. Note operation 506. In one embodiment, the incentive may be displayed on the GUI displaying the available preference levels. For example, any information associated with the incentive may be displayed. The incentive may optionally be identified utilizing a table mapping the selected preference level to the incentive (e.g. such as the incentives table 414 of FIG. 4).

It is further determined whether the selected preference level is saved, as shown in decision 508. In one embodiment, the selected preference level may be saved by the user. Just by way of example, the user may select an option (e.g. on the GUI) to save the selected preference level. In another embodiment, the user may select to save the preference level if the user to indicate a preference for advertisements to be received in accordance with the preference level.

If it is determined that the selected preference level is not saved, the method 500 returns to displaying available preference levels to the user (operation 502). In this way, the available preference levels may continue to be displayed to the user until the user saves a selected preference level. As an option, display of the available preference levels may be automatically terminated after expiration of a predetermined time period.

If it is determined that the selected preference level is saved, the selected preference level is transmitted to an advertisement platform for storage in a user profile. Note operation 510. For example, the selected preference level may be transmitted over a network for the advertisement platform. In this way, the user may select a preference level and save such preference level to an associated user profile such that advertisements may be received by the user in accordance with the preference level (for example, as described in FIG. 6).

Figure 6:
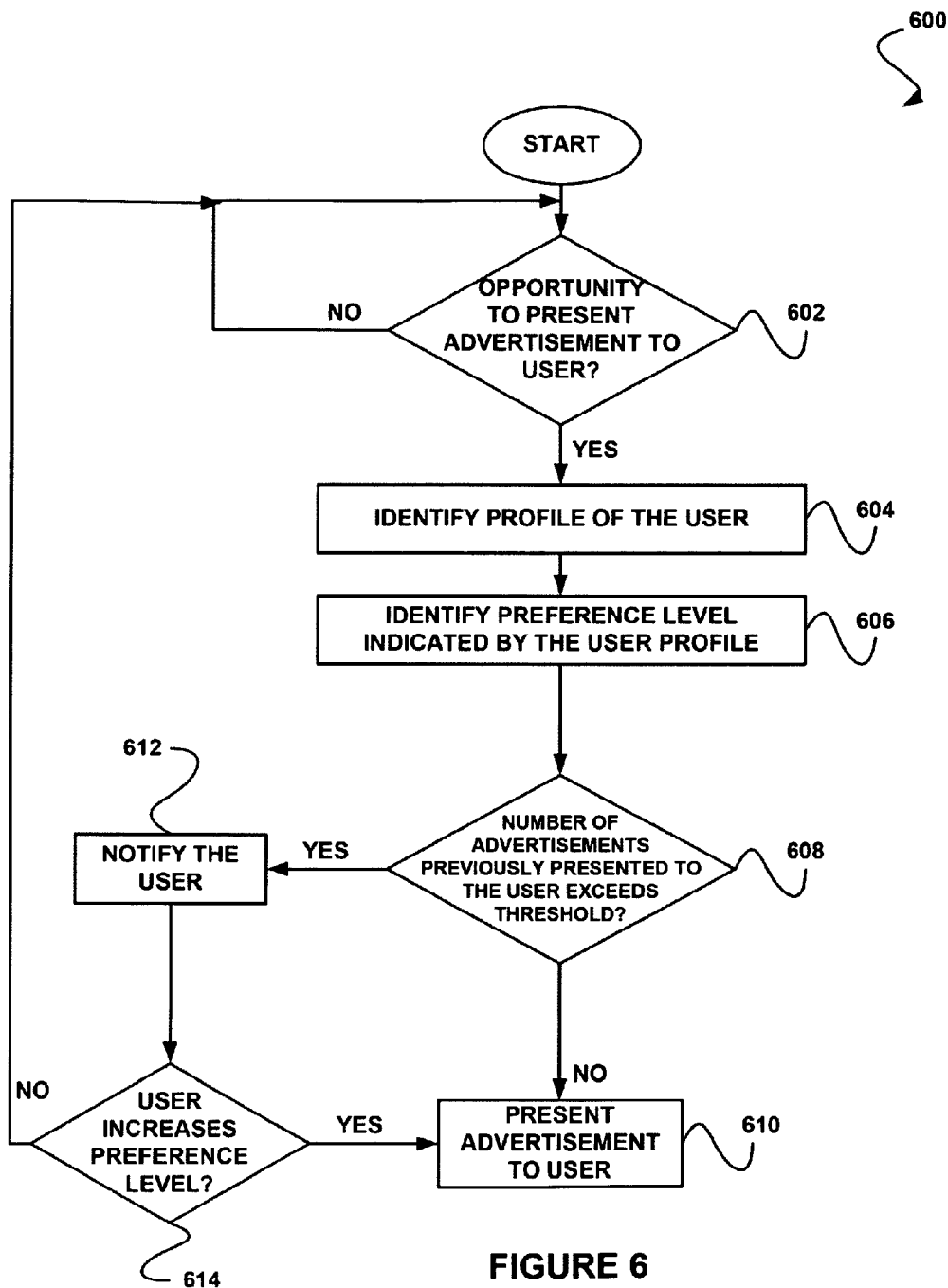
FIG. 6 illustrates a method for presenting an advertisement to a user based on a preference level of the user, in accordance with still yet another embodiment.

FIG. 6 illustrates a method 600 for presenting an advertisement to a user based on a preference level of the user, in accordance with still yet another embodiment. As an option, the method 600 may be carried out in the context of the details of FIGS. 1-5. For example, the method 600 may be carried out by the advertisement platform 404 of FIG. 4. Of course, however, the method 600 may be carried out in any desired environment. Yet again, the aforementioned definitions may equally apply to the description below.

As shown in decision 602, it is determined whether an opportunity to present an advertisement to a user exists. For example, the determination may include determining whether a device of the user is in a state predetermined to be indicative of an opportunity to present an advertisement to a user. Such state may include an idle state, for example. As another example, the determination may include determining whether a predetermined period of time has elapsed since a previous presentation of an advertisement to the user.

If it is determined that an opportunity to present an advertisement to the user does not exist, the method 600 continues to wait for such an opportunity. If, however, it is determined that an opportunity to present an advertisement to the user exists, a profile of the user is identified. Note operation 604. In one embodiment, the profile of the user may be identified utilizing a table of user profiles (e.g. such as the allowance table 412 of FIG. 4).

Additionally, as shown in operation 606, a preference level of the user indicated by the user profile is identified. The preference level may identify a threshold number of advertisements preferred to be received by the user within a predetermined period of time, with respect to the present embodiment.

Furthermore, it is determined whether a number of advertisements previously presented to the user exceeds the threshold number of advertisements indicated by the preference level. Note decision 608. Just by way of example, the number of advertisements previously presented to the user may be determined with respect to a particular time period. In this way, the determination may include determining whether the number of advertisements previously presented to the user within the particular time period exceeds the threshold indicated by the preference level for that time period.

If it is determined that the number of advertisements previously presented to the user does not exceed the threshold, an advertisement is presented to the user. Note operation 610.

Additionally, after the presentation of the advertisement to the user, the number of advertisements previously presented to the user may be increased to account for such presented advertisement. Further, if the increase in the number of advertisements previously presented to the user that is responsive to the presentation of the advertisement results in the number of advertisements previously presented to the user exceeding the threshold, an incentive associated with the preference level of the user may be provided to the user.

If it is determined that the number of advertisements previously presented to the user exceeds the threshold, the user is notified. Note operation 612. The notification may inform the user that the maximum number of advertisements indicated by the preference level of the user has been met by the number of advertisements previously presented to the user. Furthermore, the notification may provide an option to the user to update the preference level of the user (e.g. to a new preference level indicating a preference for more advertisements, etc.). In one embodiment, selection of the option may result in display of a GUI on a device of the user capable of being used for changing the preference level of the user (e.g. such as the GUI 408 of FIG. 4).

As shown in decision 614, it is determined whether the user increases the performance level. With respect to the present embodiment, increasing the preference level may include changing the preference level to a new preference level indicating a preference for more advertisements than the previous preference level of the user. If it is determined that the user does not increase the performance level, the method 600 returns to waiting for another opportunity to present an advertisement to the user to exist (decision 602). If it is determined that the user increases the performance level, an advertisement is presented to the user (operation 610).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A computer program product embodied on a non-transitory computer readable medium, which, when executed by a processor, causes the processor to perform a method, the method comprising:
    receiving a selection of a preference level in response to a user selecting a save option, the selection of the preference level received from the user through a portal of an advertisement platform;
    storing the selected preference level in a subscriber profile of the user, the subscriber profile of the user stored in an allowance table;
    storing, in the subscriber profile of the user in the allowance table, a preferred type of advertising to be received by the user, the preferred type of advertising indicating at least one of short message service, multimedia messaging service, and banner advertisements;
    storing, in the subscriber profile of the user in the allowance table, a predetermined time period during which the preferred type of advertising is not to be received by the user;
    identifying an opportunity to communicate at least one advertisement to a device of the user, the opportunity including a message in transit to the device via the advertisement platform;
    identifying the subscriber profile of the user in the allowance table in response to identifying the opportunity to communicate the at least one advertisement;
    determining a preference level of the subscriber profile of the user based on the subscriber profile including the selected preference level, the preferred type of advertising to be received by the user, and the predetermined time period during which the preferred type of advertising is not to be received by the user;
    embedding the at least one advertisement in the message and communicating the at least one advertisement to the device of the user, based on the determined preference level of the subscriber profile of the user;
    determining that a number of advertisements previously presented to the user meets a threshold number of advertisements indicated by the selected preference level of the user;
    providing an incentive associated with the selected preference level to the user in response to the communication of the at least one advertisement and the determination that the number of advertisements previously presented to the user meets the threshold;
    determining that a current number of advertisements previously presented to the user exceeds the threshold number of advertisements indicated by the selected preference level of the user; and
    notifying the user that the current number of advertisements previously presented to the user exceeds the threshold in response to the determination that the current number of advertisements previously presented to the user exceeds the threshold, the notification including an option to the user to update the selected preference level of the user to a new preference level indicating a preference for more advertisements.

2. The computer program product of claim 1, wherein the device of the user includes a mobile device.

3. The computer program product of claim 1, wherein communicating the at least one advertisement to the device of the user includes displaying the at least one advertisement on the device of the user.

4. The computer program product of claim 1, wherein a plurality of advertisements are communicated to the device of the user over a period of time.

5. The computer program product of claim 1, wherein the user utilizes a graphical user interface to update the preference level.

6. The computer program product of claim 5, wherein a sliding scale on the graphical user interface is utilized to update the preference level.

7. The computer program product of claim 6, wherein each of a plurality of locations on the sliding scale is associated with a different preference level.

8. The computer program product of claim 7, wherein each different preference level is associated with a different incentive.

9. The computer program product of claim 5, wherein the graphical user interface displays the incentive in response to the updating of the preference level.

10. The computer program product of claim 1, wherein the incentive is predetermined for the preference level.

11. The computer program product of claim 1, wherein the incentive includes a service.

12. The computer program product of claim 1, wherein the incentive includes a discount.

13. The computer program product of claim 1, wherein the incentive is mapped to the preference level in a table.

14. The computer program product of claim 1, wherein the preference level of the user is associated with a predetermined period of time, such that the number of advertisements communicated to the device of the user within the predetermined period of time is within the preference level of the user.

15. The computer program product of claim 1, wherein the opportunity further includes a determination that a predetermined period of time has elapsed since a previous presentation of an advertisement to the user.

16. The computer program product of claim 1, wherein the opportunity further includes a state of the device of the user in which the device is utilized for accessing a webpage.

17. The computer program product of claim 1, wherein the opportunity further includes a state of the device of the user in which the device is not being used for communication purposes.

18. The computer program product of claim 1, wherein the incentive includes a credit applied to a bill for a service utilized by the user, the bill generated during a billing cycle in which it is determined that the number of advertisements previously presented to the user meets the threshold number of advertisements indicated by the selected preference level of the user.

19. The computer program product of claim 1, further including aggregating the selected preference level of the user with a plurality of selected preference levels of a plurality of other users by generating a summary of a predetermined number of subscribers associated with each selected preference level, and transmitting the aggregated selected preference levels.

20. A method, comprising:
    receiving, by a computer, a selection of a preference level in response to a user selecting a save option, the selection of the preference level received from the user through a portal of an advertisement platform;
    storing the selected preference level in a subscriber profile of the user, the subscriber profile of the user stored in an allowance table;
    storing, in the subscriber profile of the user in the allowance table, a preferred type of advertising to be received by the user, the preferred type of advertising indicating at least one of short message service, multimedia messaging service, and banner advertisements;
    storing, in the subscriber profile of the user in the allowance table, a predetermined time period during which the preferred type of advertising is not to be received by the user;
    identifying an opportunity to communicate at least one advertisement to a device of the user, the opportunity including a message in transit to the device via the advertisement platform;
    identifying the subscriber profile of the user in the allowance table in response to identifying the opportunity to communicate the at least one advertisement;
    determining a preference level of the subscriber profile of the user based on the subscriber profile including the selected preference level, the preferred type of advertising to be received by the user, and the predetermined time period during which the preferred type of advertising is not to be received by the user;
    embedding the at least one advertisement in the message and communicating the at least one advertisement to the device of the user, based on the determined preference level of the subscriber profile of the user;
    determining that a number of advertisements previously presented to the user meets a threshold number of advertisements indicated by the selected preference level of the user;
    providing an incentive associated with the selected preference level to the user in response to the communication of the at least one advertisement and the determination that the number of advertisements previously presented to the user meets the threshold;
    determining that a current number of advertisements previously presented to the user exceeds the threshold number of advertisements indicated by the selected preference level of the user; and
    notifying the user that the current number of advertisements previously presented to the user exceeds the threshold in response to the determination that the current number of advertisements previously presented to the user exceeds the threshold, the notification including an option to the user to update the selected preference level of the user to a new preference level indicating a preference for more advertisements.

21. A system, comprising:
    a hardware processor for:
        receiving a selection of a preference level in response to a user selecting a save option, the selection of the preference level received from the user through a portal of an advertisement platform;
        storing the selected preference level in a subscriber profile of the user, the subscriber profile of the user stored in an allowance table;
        storing, in the subscriber profile of the user in the allowance table, a preferred type of advertising to be received by the user, the preferred type of advertising indicating at least one of short message service, multimedia messaging service, and banner advertisements;
        storing, in the subscriber profile of the user in the allowance table, a predetermined time period during which the preferred type of advertising is not to be received by the user;
        identifying an opportunity to communicate at least one advertisement to a device of the user, the opportunity including a message in transit to the device via the advertisement platform;
        identifying the subscriber profile of the user in the allowance table in response to identifying the opportunity to communicate the at least one advertisement;
        determining a preference level of the subscriber profile of the user based on the subscriber profile including the selected preference level, the preferred type of advertising to be received by the user, and the predetermined time period during which the preferred type of advertising is not to be received by the user;
        embedding the at least one advertisement in the message and communicating the at least one advertisement to the device of the user, based on the determined preference level of the subscriber profile of the user;
        determining that a number of advertisements previously presented to the user meets a threshold number of advertisements indicated by the selected preference level of the user;
        providing an incentive associated with the selected preference level to the user in response to the communication of the at least one advertisement and the determination that the number of advertisements previously presented to the user meets the threshold;

determining that a current number of advertisements previously presented to the user exceeds the threshold number of advertisements indicated by the selected preference level of the user; and notifying the user that the current number of advertisements previously presented to the user exceeds the threshold in response to the determination that the current number of advertisements previously presented to the user exceeds the threshold, the notification including an option to the user to update the selected preference level of the user to a new preference level indicating a preference for more advertisements.

22. The system of claim 21, wherein the hardware processor is coupled to memory via a bus.

* * * * *